US009201333B2

(12) United States Patent
Fukumoto et al.

(10) Patent No.: US 9,201,333 B2
(45) Date of Patent: *Dec. 1, 2015

(54) HEAT-SHRINKABLE RESIN TUBE AND ROTARY MEMBER FOR IMAGE FORMING APPARATUS

(75) Inventors: Yasuhiro Fukumoto, Sennan-gun (JP); Hong-Phuc Nguyen, Sennan-gun (JP)

(73) Assignee: SUMITOMO ELECTRIC FINE POLYMER, INC., Sennan-gun, Osaka (JP)

( * ) Notice: Subject to any disclaimer, the term of this patent is extended or adjusted under 35 U.S.C. 154(b) by 226 days.

This patent is subject to a terminal disclaimer.

(21) Appl. No.: 13/353,980

(22) Filed: Jan. 19, 2012

(65) Prior Publication Data

US 2012/0225232 A1 Sep. 6, 2012

(30) Foreign Application Priority Data

Mar. 4, 2011 (JP) ................................ 2011-047486

(51) Int. Cl.

| | |
|---|---|
| ***B32B 1/08*** | (2006.01) |
| ***G03G 15/02*** | (2006.01) |
| ***G03G 15/08*** | (2006.01) |
| ***G03G 15/16*** | (2006.01) |

(52) U.S. Cl.

CPC ........ *G03G 15/0233* (2013.01); *G03G 15/0818* (2013.01); *G03G 15/1685* (2013.01); *Y10T 428/139* (2015.01)

(58) Field of Classification Search

CPC .. B32B 1/08; G03G 15/0233; G03G 15/0818; G03G 15/1685; Y10T 428/139

USPC ................................ 428/35.7, 36.9; 393/333

See application file for complete search history.

(56) References Cited

U.S. PATENT DOCUMENTS 6,132,815 A * 10/2000 Takahashi et al. ............ 427/553
2004/0224245 A1* 11/2004 Shigezaki et al. .............. 430/66

FOREIGN PATENT DOCUMENTS

JP S48-34969 A 5/1973
JP 63-213880 9/1988

(Continued)

OTHER PUBLICATIONS

Machine Translation of JP 2008-200954 (Sep. 2008).*

(Continued)

*Primary Examiner* — Erik Kashnikow

(74) *Attorney, Agent, or Firm* — Drinker Biddle & Reath LLP

(57) ABSTRACT

Provided is a heat-shrinkable resin tube for forming a resin layer on a rotary member for an image forming part, such as a charging roller, a developing roller, or a transfer roller, a rotary member for support, or a rotary member for paper discharge in an image forming apparatus, in which a maximum depth of at least one linear scratch on a surface of the heat-shrinkable resin tube is 0.8 μm or less. A maximum length of the at least one linear scratch may be 1 mm or less, the resin tube may have a thickness of 100 μm or less, and the at least one linear scratch may extend in a direction parallel to an axial direction of the resin tube or in a direction tilted by 20° or less with respect to the axial direction.

3 Claims, 3 Drawing Sheets

(56) References Cited

FOREIGN PATENT DOCUMENTS

| | | | |
|---|---|---|---|
| JP | H11-80387 | A | 3/1999 |
| JP | 2003-162129 | A | 6/2003 |
| JP | 2003-211542 | | 7/2003 |
| JP | 2005-99519 | | 4/2005 |
| JP | 2008-200954 | | 9/2008 |
| JP | 2009-186617 | | 8/2009 |
| WO | 2011/104987 | | 9/2011 |

OTHER PUBLICATIONS

Notification of Reasons for Rejection dated Jan. 17, 2012 from Japanese patent application No. 2011-039340 (with attached partial English-language translation).

Examiner's Decision of Refusal dated Sep. 4, 2012 from Japanese patent application No. 2011-039340 (with attached partial English-language translation).

* cited by examiner

HEAT-SHRINKABLE RESIN TUBE AND ROTARY MEMBER FOR IMAGE FORMING APPARATUS

BACKGROUND OF THE INVENTION

1. Field of the Invention

The present invention relates to a heat-shrinkable resin tube for forming a resin layer on a rotary member for an image forming part, a rotary member for support, a rotary member for paper discharge, and the like in an image forming apparatus such as a copy machine, a printer, or a facsimile, and to a rotary member for an image forming apparatus, the rotary member including the resin tube.

2. Description of the Related Art

In image forming apparatuses, various rotary members for an image forming part, such as a developing roller, a charging roller, and a transfer roller, are used in the electrostatic process. In such a rotary member for an image forming part, a resin layer is formed using a heat-shrinkable resin tube in order to ensure durability, wear resistance, a toner releasing property, etc. Japanese Unexamined Patent Application Publication No. 2003-211542 describes that a charging roller, a transfer roller, or a developing roller is covered with a heat-shrinkable, conductive, aromatic polyester tube.

Heat shrinkability is imparted to such a resin tube by stretching the tube at least in the radial direction. An example of a method for stretching a tube includes continuously supplying an unstretched tube in a stretching pipe, applying an internal pressure to the tube to inflate the tube, and bringing the inflated tube into contact with the inner wall of the stretching pipe to control the inflated diameter of the tube.

Heat-shrinkable resin tubes in the related art have, on the inner and outer surfaces thereof, scratches and traces of rubbing formed by being rubbed with a fixing member such as a stretching pipe or a guide plate during the manufacturing of the resin tubes. Such scratches including traces of rubbing may cause cracking and splitting of the tubes. In particular, in the case where the wall thickness of a tube is small, the tube is easily broken by the scratches, and thus it is difficult to manufacture such a tube. Furthermore, even if such scratches become substantially invisible after thermal shrinkage or baking of the tube, the scratches may cause cracking and splitting, for example, during covering of a rotary member with the tube or during practical use of the rotary member. When the rotary member for image formation, the rotary member being covered with the tube, is used, the cracking and splitting may become a cause of defects of an image formed by the rotary member. In addition, such cracking and splitting cause a problem in manufacturing various rotary members in an image forming apparatus, such as a rotary member for image formation.

SUMMARY OF THE INVENTION

To solve the above problem, the present invention provides a heat-shrinkable resin tube in which scratches that become a cause of cracking and splitting are suppressed, and a rotary member for an image forming apparatus, the rotary member including the resin tube.

According to an aspect of the present invention, there is provided a heat-shrinkable resin tube for forming a resin layer on a rotary member for an image forming apparatus, wherein a maximum depth of at least one linear scratch on a surface of the resin tube is 0.8 μm or less.

In this heat-shrinkable resin tube, a maximum depth of at least one linear scratch is 0.8 μm or less, and the heat-shrinkable resin tube has substantially no scratches formed during manufacturing. Thus, cracking and splitting of the tube are not easily caused during manufacturing of the tube, during covering of a rotary member for an image forming part with the tube, and during practical use of the rotary member. Accordingly, in the case where a resin layer is formed on a rotary member for an image forming part using this resin tube, an image forming apparatus including the rotary member for the image forming part can stably form a satisfactory image.

The depth of a linear scratch can be represented as a depth determined using, as a reference, a circumferential line constituting the outer surface of the resin tube. In the case where one or a plurality of linear scratches are formed on a surface of a resin tube, among the depths of the linear scratches, the maximum value is referred to as "maximum depth of at least one linear scratch". By using the maximum depth as a reference, scratches that become a cause of cracking and splitting can be satisfactorily evaluated.

In this resin tube, a maximum length of the at least one linear scratch is preferably 1 mm or less. In the case where the surface of the tube is rubbed with a fixing member during manufacturing, the length of at least any of scratches exceeds 1 mm. When the resin tube has no such a scratch, the generation of cracking and splitting of the tube can be suppressed.

The heat-shrinkable resin tube may have a thickness (average thickness) of, for example, 100 μm or less, preferably 5 μm or more and 50 μm or less, and more preferably 10 μm or more and 40 μm or less. Even in a tube having such a small wall thickness, for example, breaking due to a scratch does not occur.

The at least one linear scratch preferably extends in a direction parallel to an axial direction of the heat-shrinkable resin tube or in a direction tilted by 20° or less with respect to the axial direction. Such a linear scratch is formed when the surface of the tube is rubbed with a fixing member or a control member that controls the outer diameter of the resin tube before and after the inflation of the resin tube during the manufacturing of the resin tube. Such a linear scratch becomes a cause of cracking and splitting of the tube when the tube is used.

The rotary member for an image forming apparatus may be, for example, a roller or belt for developing, charging, or transfer. The transfer roller and the transfer belt may include a roller and belt for a secondary transfer. The rotary member may be a cleaning roller.

According to another aspect of the present invention, there is provided a rotary member for an image forming apparatus, the rotary member including a resin layer formed using the above-described heat-shrinkable resin tube. This rotary member includes the resin tube in which scratches that become a cause of cracking and splitting are suppressed, and thus the manufacturing of the rotary member can be simplified.

According to the aspects of the present invention, the heat-shrinkable resin tube has substantially no scratches formed during manufacturing. Consequently, the generation of cracking and splitting can be suppressed during manufacturing of the tube, during covering of a rotary member with the tube, and during practical use of the rotary member.

DESCRIPTION OF THE PREFERRED EMBODIMENTS

A heat-shrinkable resin tube of the present invention is a heat-shrinkable resin tube for forming a resin layer on a rotary member for an image forming part used in an image forming part of an image forming apparatus. Examples of the rotary member for an image forming part include a developing roller, a charging roller, a transfer roller, a cleaning roller, an endless belt for development, an endless belt for charging, an endless belt for transfer, and an endless belt for cleaning.

Figure 1:
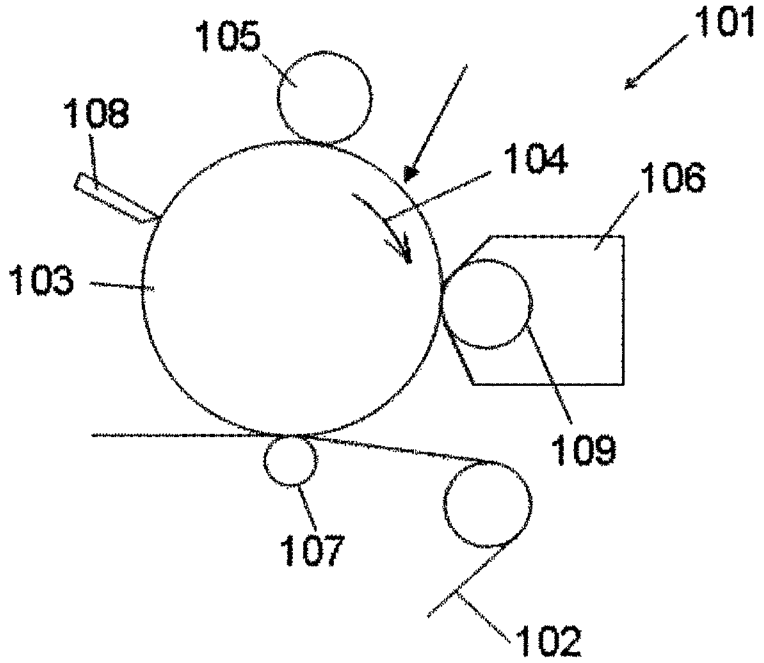
FIG. 1 is a schematic view illustrating a structural example of an image forming unit of an image forming apparatus.

FIG. 1 is a schematic view illustrating a structural example of an image forming unit of an image forming apparatus. An image forming unit 101 in this embodiment is one of image forming units of a tandem-type color image forming apparatus. The tandem-type color image forming apparatus includes an image forming part that includes image forming units for respective colors of cyan, magenta, yellow, and black (CMYK). In the image forming part, an image forming unit 101 of each color forms a toner image of the color, and transfers the toner image onto an intermediate transfer belt 102. The toner images of respective colors are sequentially overlapped on the intermediate transfer belt 102, and then transferred from the intermediate transfer belt 102 to a transfer-receiving material such as paper or a synthetic resin sheet.

The image forming unit 101 forms an electrostatic latent image and a toner image on a photoconductor drum 103 and transfers the toner image to the intermediate transfer belt 102. The photoconductor drum 103 can be rotated in the direction of an arrow 104. A charging roller 105, a developing unit 106, a transfer roller 107, and a cleaning blade 108 are arranged around the photoconductor drum 103 in that order.

In the image forming unit 101, the charging roller 105 uniformly charges the surface of the photoconductor drum 103. The surface of the uniformly charged photoconductor drum 103 is irradiated with a laser beam modulated in accordance with the concentration to form an electrostatic latent image. The developing unit 106 includes a developing roller 109. A toner is caused to adhere to the electrostatic latent image on the surface of the photoconductor drum 103 by the developing roller 109 to form a toner image on the surface of the photoconductor drum 103. The transfer roller 107 is arranged on the inner side of a portion of the intermediate transfer belt 102, the portion being close to the photoconductor drum 103. The transfer roller 107 transfers the toner image formed on the surface of the photoconductor drum 103 to the intermediate transfer belt 102. The cleaning blade 108 removes the toner remaining on the surface of the photoconductor drum 103 even after the transfer of the toner image. The heat-shrinkable resin tube of the present invention can be used for forming a resin layer, for example, on the above-described intermediate transfer belt 102, charging roller 105, and developing roller 109 in the image forming part.

Examples of the material of the heat-shrinkable resin tube include fluorocarbon resins, ionomer resins, polyethylene terephthalate (PET) resins, nylon resins, polyethylene resins, polyolefin resins, and other various resins. As the fluorocarbon resins, for example, tetrafluoroethylene/perfluoroalkyl vinyl ether copolymers (PFA) is used. By using PFA, a long tube can be easily, continuously, and stably obtained by extrusion. Examples of the fluorocarbon resins further include tetrafluoroethylene/hexafluoropropylene copolymers (FEP), polytetrafluoroethylene (PTFE), ethylene/tetrafluoroethylene copolymers (ETFE), polychlorotrifluoroethylene (PCTFE), ethylene/chlorotrifluoroethylene copolymers (ECTFE), and polyvinylidene fluoride (PVDF). These fluorocarbon resins may be used alone or in combination of two or more resins. The heat-shrinkable resin tube may include a plurality of layers formed by multiple extrusion. Electrical conductivity may be imparted to the resins by incorporating carbon or the like.

To impart electrical conductivity, ion-conductive agents such as electrically conductive fillers, ion-conductive organophosphorus salts, and quaternary ammonium salts are used. Examples of the electrically conductive fillers include metal powders such as a silicon powder, carbon, carbon nanotubes, graphite, and inorganic fillers. As for the metal powders, metal nanoparticles having a particle diameter on the order of nanometers have high dispersibility, and thus can be preferably used. Examples of the inorganic fillers include silicon carbide, boron nitride, alumina, aluminum nitride, potassium titanate, mica, silica, titanium oxide, talc, and calcium carbonate.

Heat shrinkability is imparted to the resin tube by inflating a tube formed by extrusion to stretch the tube at least in the radial direction. An outer peripheral surface of (a base of) a rotary member for an image forming part is covered with this heat-shrinkable resin tube, and heating is conducted in this state, thereby fusion-bonding the resin tube to the outer peripheral surface. Thus, a resin layer is formed on the rotary member for the image forming part. The stretch ratio can be appropriately determined in accordance with a desired heat-shrinkage ratio. For example, the stretch ratio is 1.00 to 2.0 times, and preferably 1.02 to 1.5 times in both the axial direction and the radial direction.

The heat-shrinkage ratio of the resin tube may be measured after a sample is left to stand in a thermostatic chamber (in a dry atmosphere) for 30 minutes. In this case, the heat-shrinkage ratio of the resin tube is usually 5% to 50%, and preferably 10% to 30%. For example, in the case of a polyolefin resin sample, the temperature is 90° C. The temperature is different depending on the type of resin used. For example, a sample prepared by cutting a resin tube in the axial direction and in the circumferential direction so as to have a size of 10 cm square can be used as the measurement sample. In the case where a sample having a size of 10 cm square cannot be obtained, the evaluation in the axial direction may be performed by using a sample prepared by cutting a tube so as to have a length of 10 cm in the axial direction, and the evaluation in the radial direction may be performed by measuring a change in the folding diameter (a dimension in the width direction in a state where the tube is folded).

The thickness (average thickness) of the resin tube is, for example, 100 μm or less, preferably 5 μm or more and 50 μm or less, and more preferably 10 μm or more and 40 μm or less. The length of the resin tube may be appropriately determined in accordance with the length of a base. In the case of a roller shape, it is preferable to determine the length of the resin tube after shrinking so that a roller bearing portion is substantially exposed.

The inner diameter of the resin tube is adjusted so as to be larger by usually 0.5% to 30%, and preferably 1% to 10% than the outer diameter of an object to be covered. When the ratio of the inner diameter of the resin tube to the outer diameter of the object to be covered is excessively small, it is difficult to smoothly cover the object with the resin tube. On the other hand, when the ratio is excessively large, although the covering workability is relatively good, fusion bondability to the object to be covered tends to decrease and defects such as irregularities and wrinkles tend to be formed on the resulting covering layer after thermal shrinkage and fusion bonding. In addition, in the case where the ratio is excessively large and a conductive resin is used as the resin tube, the resistance of the resulting covering layer tends to vary due to variations in the shrinkage.

The resin tube may include a single layer or multiple layers of two or more layers. In the case where the resin tube includes multiple layers, properties of the respective layers, such as electrical conductivity and wear resistance, may be different from each other. Regarding the electrical conductivity, an inner layer may have a resistance lower than the resistance of a layer disposed outside thereof. Wear resistance can also be varied by using, for example, a tube containing PTFE and a tube containing glass beads. The portion including the multiple layers may extend over the entire length of the tube or may be located in a part of the tube. In the case where a part of the tube includes multiple layers, the part is preferably, for example, each end of the tube, which is easily worn. To manufacture a resin tube in which only both ends thereof includes multiple layers, a tube prepared by cutting so as to have a short length may be inserted into each of the ends or only the ends of the tube may be folded back.

The heat-shrinkable resin tube of the present invention can be used for a transfer belt or other rotary members for an image forming part, as described above. For a transfer belt, for example, it is possible to use a heat-shrinkable resin tube having a two-layer structure in which a heat-shrinkable PFA tube is thermally fusion-bonded to an outer peripheral surface of a thermosetting polyimide tube. The heat-shrinkable resin tube may have a three-layer structure including an adhesive layer between the PFA tube and the polyimide tube. An outermost layer may be further provided in order to control wear resistance or the electrical resistance.

The thermosetting polyimide tube can be obtained by applying a polyimide precursor (referred to as "polyamide acid" or "polyamic acid") varnish onto an outer surface of a columnar metal mold or a cylindrical metal mold, drying, and then curing by heating. Alternatively, the tube may be formed by applying a polyimide precursor varnish onto an inner surface of a cylindrical metal mold. The application method is not particularly limited. For example, a polyimide precursor varnish is applied onto an outer surface of a metal mold, and a die having an inner diameter larger than the outer diameter of the metal mold is then passed outside the metal mold. Thus, a coating film having a desired thickness is formed.

After the polyimide precursor varnish is dried, the resulting polyimide precursor tube is cured by heating in a state where the polyimide precursor tube is caused to adhere to the surface of the metal mold. Alternatively, after the polyimide precursor varnish is dried, the resulting polyimide precursor tube is detached from the metal mold at the time when the strength of the polyimide precursor tube is increased to the extent that the tube can maintain the structure as a tubular product, and then cured by heating. By heating the polyimide precursor to a maximum temperature of 350° C. to 450° C., the polyamide acid is dehydrated and cyclized, and thus converted to a polyimide.

From the standpoint of heat resistance, mechanical strength, etc., the thermosetting polyimide is preferably a condensation-type wholly aromatic polyimide. An example of the thermosetting polyimide tube is obtained by performing a polymerization reaction between an acid dianhydride such as pyromellitic dianhydride, 3,3',4,4'-diphenyltetracarboxylic dianhydride, or oxydiphthalic dianhydride and a diamine such as 4,4'-diaminodiphenyl ether, p-phenylenediamine, or 4,4'-diaminobenzanilide in an organic solvent to synthesize a polyimide precursor, forming a tube using an organic solvent solution (varnish) of the polyimide precursor, and then heating the tube to perform dehydration and ring closure of the polyimide precursor. As such a polyimide varnish, commercially available products may be used besides varnishes that are uniquely synthesized.

The thickness, the outer diameter, the length, and the like of the thermosetting polyimide tube may be appropriately selected in accordance with the application. The thickness of the thermosetting polyimide tube is usually 30 to 150 μm, and preferably 50 to 80 μm. The outer diameter of the thermosetting polyimide tube is usually 15 to 80 mm, and preferably 15 to 40 mm. The length of the thermosetting polyimide tube may be appropriately determined in accordance with the size of a transfer-receiving material.

The thermosetting polyimide tube may contain an inorganic filler, an electrically conductive filler such as carbon, carbon nanotubes (CNTs), or graphite, or a metal filler, as required. Examples of the inorganic filler include silica, alumina, silicon carbide, boron carbide, titanium carbide, tungsten carbide, silicon nitride, boron nitride, aluminum nitride, mica, potassium titanate, barium titanate, calcium carbonate, magnesium oxide, zirconium oxide, and talc. Among these, from the standpoint of high thermal conductivity, alumina, silicon carbide, boron carbide, and boron nitride are preferable. In the case where an inorganic filler is incorporated in a heat-resistant resin tube, the inorganic filler is used in a ratio of usually 50% by volume or less, and 40% by volume or less in many cases. The lower limit of the amount of inorganic filler is 5% by volume in many cases.

As the PFA, for example, various commercially available products such as 350-J, HP series, e.g., 451HP-J, 950HP-Plus, and 951HP-Plus, and PF-059, all of which are manufactured by Du Pont-Mitsui Fluorochemicals Co., Ltd., can be used. For example, the crystallization temperature of 950HP-Plus is 270° C. When the temperature reaches 270° C., PFA molecules are in a semi-molten state and bonded to a primer containing a fluorocarbon resin. This PFA tube is an extruded product, and thus a molecular orientation due to extrusion strongly remains in the axial direction. Accordingly, cracks may be formed in the orientation direction in some operating environments. In such a case, the oriented state can be relaxed by reheating the tube to the melting point or higher (rebaking). Alternatively, in the step of first heating, the tube may be heated to the melting point or higher so that bonding to the primer and relaxation of the orientation are performed at the same time. By fusion-bonding this PFA tube, a resin layer is formed on the thermosetting polyimide tube.

Examples of a method for bonding a tube includes a method in which shrinking and bonding are performed by placing a rubber roller covered with a PFA tube in a thermostatic chamber at 300° C. and a method in which bonding is performed by rotating a rubber roller covered with a PFA tube on a hot plate at 300° C. while applying a pressure. The temperature of the thermostatic chamber or the hot plate is not limited to 300° C., and may be, for example, the crystallization temperature of the PFA tube or higher, or the melting point thereof or higher. The temperature of the thermostatic chamber or the hot plate can be appropriately selected in accordance with the material to be laminated, the type of primer, or the intended use. Prior to the bonding, for example, such a rubber roller covered with a tube may be placed in a thermostatic chamber at 250° C. for 30 minutes to perform preliminary shrinking. In bonding of respective layers, a suitable adhesive, a physical bonding method such as etching, or a combination of these may be used. Furthermore, bonding or a bonding force can also be improved by electron beam irradiation.

Furthermore, heat resistance or wear resistance of a fluorocarbon resin tube may be modified by increasing the cross-linking density by electron beam irradiation. The electron beam irradiation may be performed on an uninflated tube or an inflated tube. The electron beam irradiation may be performed after preliminary shrinking or after bonding.

In the case where the heat-shrinkable resin tube of the present invention is used in a developing roller or a charging roller, the roller may include a base, a rubber layer, a resin layer formed using the heat-shrinkable resin tube, and a surface layer. The rubber layer and the surface layer can be selected according to need. A metal material such as iron or aluminum, a resin, or a paper tube can be used as the base. The diameter of the base is, for example, 4 to 10 mm. The rubber layer may be selected from silicone rubber, urethane rubber, and epichlorohydrin rubber, and these rubber materials may be either solid rubber or foamed rubber. When a difference between the inner diameter of the heat-shrinkable resin tube before shrinking and the outer diameter of an object to be covered is small, variations in a change in the wall thickness due to shrinking and variations in the electrical resistance can be reduced. For example, when the outer diameter of the object to be covered is 16 mm, the inner diameter of the resin tube is set to 17 mm (A gap in the radius direction is set to 0.01 to 1.0 mm). A urethane resin, a urethane-modified silicone resin, a silicone resin, an epoxy resin, or the like may be used as the surface layer. The thickness of the surface layer is, for example, 5 to 20 μm. In order to control wear resistance and the electrical resistance, carbon or an ion-conductive filler may be added to the surface layer. Furthermore, in order to impart a charging property, a filler may be incorporated in the surface layer. Examples of the filler include resins such as acrylic resins and nylon resins, cotton, and cellulose. The shape of the filler may be a block shape or a spherical shape, but is not limited thereto. The filer may be appropriately selected and incorporated in accordance with the intended use. An appropriate adhesive may be used for bonding between the base and the heat-shrinkable resin tube. For example, when the resin tube is composed of a fluorocarbon resin, a compound of a fluorocarbon resin, polyamide-imide (PAI), polyethersulfone (PES), etc. is used as the adhesive. When the resin tube is composed of a polyolefin, polyamide is used as the adhesive. A film composed of the adhesive may be provided. Alternatively, a solution or aqueous dispersion of the adhesive may be applied.

In the case where a resin layer is formed on a rotary member for an image forming part using a heat-shrinkable resin tube, cracking and splitting of the resin tube may be caused by a scratch on the surface of the resin tube. In the heat-shrinkable resin tube of the present invention, the depth of a linear scratch on the surface of the tube is 0.8 μm at most so as to avoid such cracking and splitting. When the maximum depth of linear scratches formed on the surface of the resin tube is 0.8 μm or less, it is possible to suppress the generation of cracking and splitting of the tube due to the scratches. In order to sufficiently suppress the generation of cracking and splitting over the entire surface of the heat-shrinkable resin tube, it is necessary that the resin tube have no linear scratches or the depths of all linear scratches be suppressed to 0.8 μm or less.

The linear scratches extend in a direction substantially parallel to the axial direction of the resin tube or in a direction tilted by an angle of, for example, 20° at the maximum with respect to the axial direction. This tilt may be determined by linearly approximating the linear scratches. The length of each of the linear scratches is preferably 1 mm or less at least at the time of the manufacturing. These measurements can be performed using an optical microscope. In particular, linear scratches which become a cause of cracking and splitting of a resin tube are scratches formed when the surface of the resin tube is rubbed with a fixing member or a control member that controls the outer diameter of the resin tube before and after the inflation of the resin tube. These scratches are formed in a direction parallel to the axial direction of the tube or in a direction slightly tilted by an angle with respect to the axial direction, and are not formed in the circumferential direction of the tube. Furthermore, scratches are formed on the surface of the tube, which is continuously transported, over the substantially entire length of the tube, and the length of each of the scratches exceeds 1 mm. In addition to these scratches, scratches may be formed on the surface of the resin tube during polishing, etc. The polishing is performed in the circumferential direction of the tube. Therefore, in general, linear scratches extending in the axial direction are not formed by the polishing.

Figure 2:
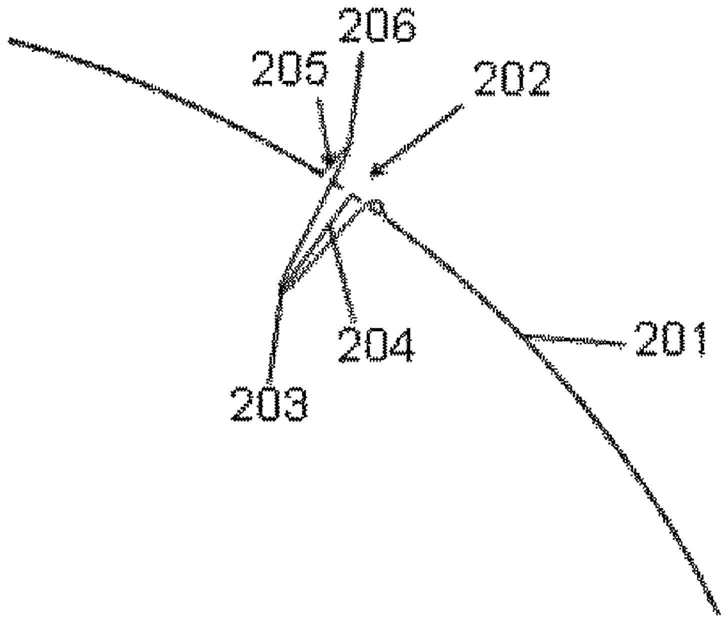
FIG. 2 is a view illustrating a depth of a linear scratch of a heat-shrinkable resin tube.

FIG. 2 is a view illustrating a depth of a linear scratch of a resin tube. FIG. 2 illustrates a part of a cross-sectional curve based on a circumferential line 201 constituting the outer peripheral surface of the tube, and a linear scratch 202 is formed in the part. The depth of the linear scratch 202 can be measured as a depth 204 from the circumferential line 201 to the deepest portion 203 of the linear scratch 202. Even if a projecting portion 205 projecting from the circumferential line 201 is formed at the time of the formation of the scratch, the depth of the linear scratch 202 is represented not by a depth from a top 206 of the projecting portion 205 to the deepest portion 203 but by the depth from the circumferential line 201 to the deepest portion 203. By using the circumferential line 201 as a reference, it is possible to evaluate a scratch which becomes a cause of cracking and splitting of the tube. In the case where a plurality of linear scratches 202 are formed on the surface of the resin tube, among the depths of the linear scratches 202, the maximum value is defined as the maximum depth.

This resin tube can be stretched by, for example, two methods. One of the methods is a batch method in which an unstretched tube is arranged in a pipe, and is inflated by applying an inner pressure to the tube. Another method is a method in which a tube inflated by sending air inside the tube is pinched with two pairs of pinch rollers, thereby filling the tube with air, and the distance between the pairs of pinch rollers is decreased to increase the inner pressure of the tube, to inflate the tube, and to adjust the inflated diameter of the tube. In these methods, the surface of the inflated resin tube is not rubbed with a fixing member. In the latter method, both ends of the tube are pinched by the pinch rollers. However, since the tube is transported by the pinch rollers, the surface of the tube is not rubbed. Even when a reel is used in a path of the tube as required, the surface of the tube is not rubbed because the reel is also rotated together. Scratches are also not formed on the inner surface of the tube. Consequently, it is possible to obtain a resin tube in which, even if linear scratches are present on the surface, the maximum depth of the linear scratches is 0.8 μm or less.

In the case where the resin tube is pinched by the pinch rollers, the tube is pressed and a fold line may be formed. In order to reduce or remove the fold line, preferably, the holding pressure is controlled to be a certain value or less or the rollers have a normal crown shape so that an excessive pressure is not applied to the tube.

Figure 3A:
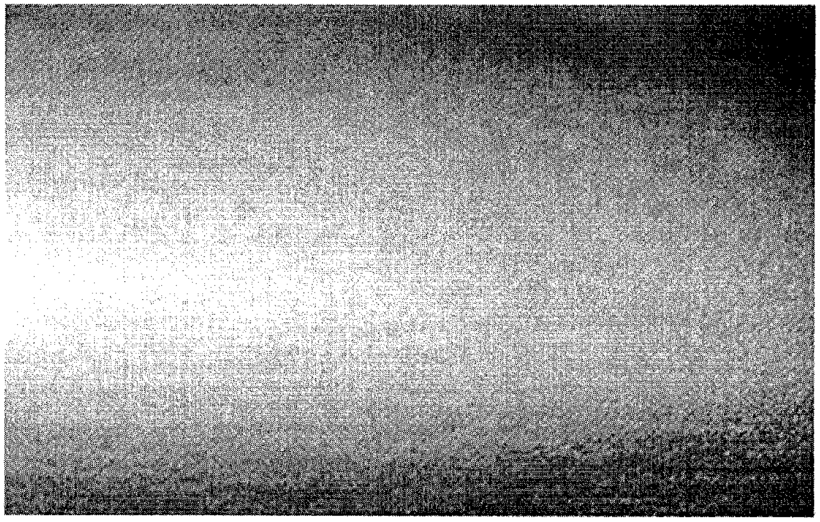
FIGS. 3A and 3B are photographs each showing a surface state of a heat-shrinkable resin tube stretched using two pairs of pinch rollers.
Figure 3B:
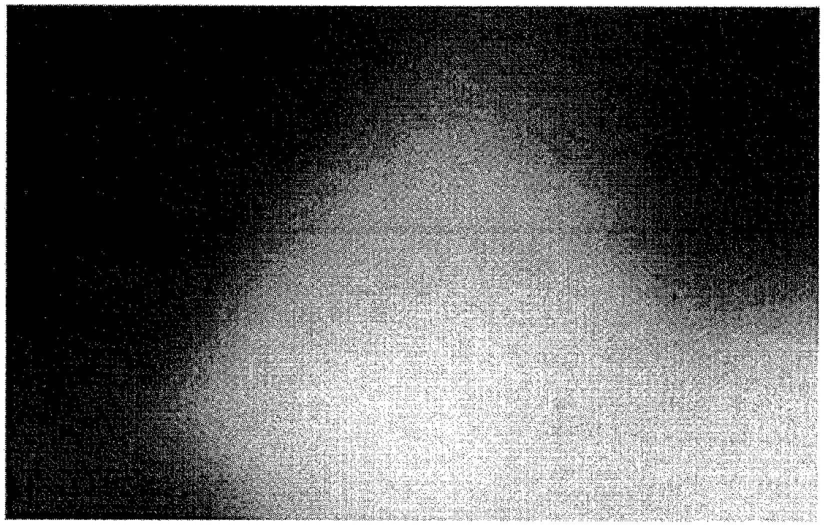

FIGS. 3A and 3B are photographs each showing a surface state of a tube stretched using two pairs of pinch rollers. FIG. 3A shows a surface state of a polyolefin resin tube stretched by the above method. FIG. 3B shows a surface state of a PFA tube stretched by the above method. The images of these surface states were taken with an optical microscope at a magnification of 20. In FIGS. 3A and 3B, the horizontal direction corresponds to the axial direction of the tube, and the vertical direction corresponds to the circumferential direction of the tube. No linear scratches are observed on the surfaces of these resin tubes. Accordingly, in the case where these resin tubes are used in rotary members, the occurrence of cracking and splitting of the resin layer is suppressed, and a satisfactory image can be stably obtained for a long period of time.

Figure 4A:
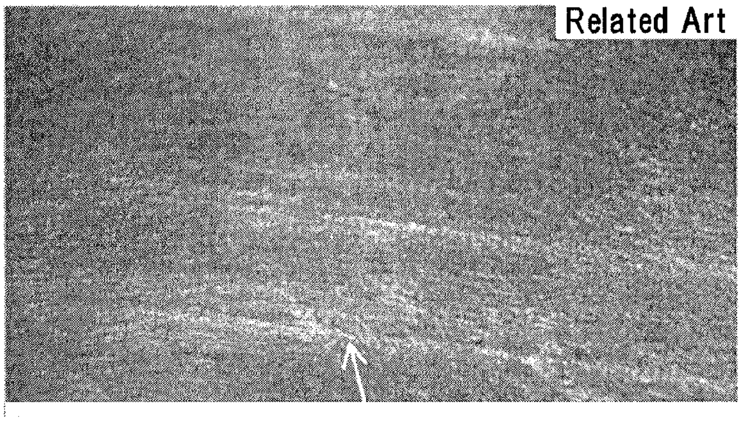
FIGS. 4A to 4C are photographs each showing a surface state of a heat-shrinkable resin tube in the related art.
Figure 4B:
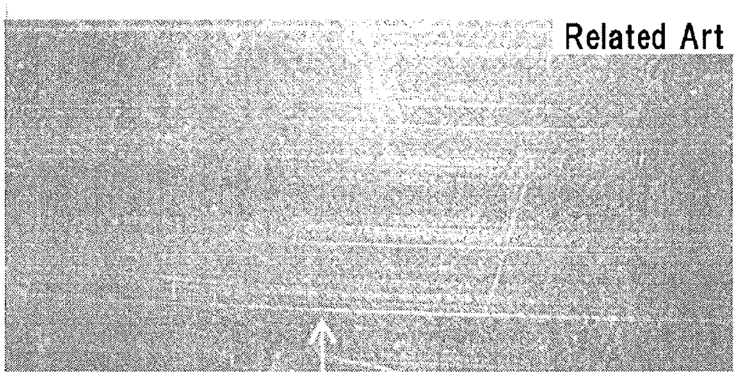
Figure 4C:
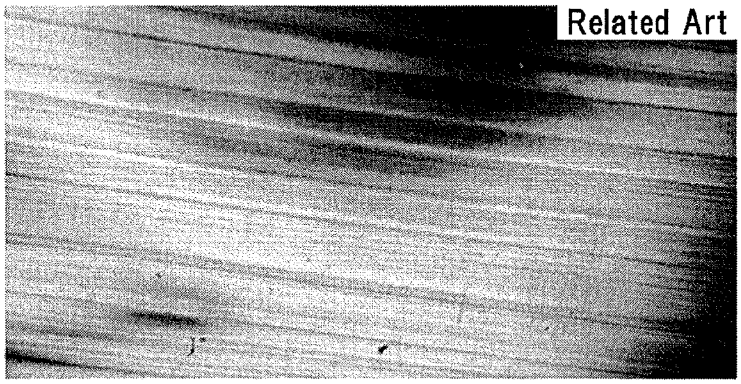

FIGS. 4A to 4C are photographs each showing a surface state of a heat-shrinkable resin tube in the related art. FIG. 4A shows a surface state of a polyolefin resin tube, FIG. 4B shows a surface state of a polyethylene resin tube, and FIG. 4C shows a surface state of a PFA tube. In FIGS. 4A to 4C, the horizontal direction corresponds to the axial direction of the tube, and the vertical direction corresponds to the circumferential direction of the tube. These tubes were each manufactured by a method in which an inflated tube is brought into contact with an inner wall of a stretching pipe to control the inflated diameter of the tube. In each of the resin tubes in the related art, linear scratches formed during stretching extend in the horizontal direction. The depth of each of the linear scratches exceeds 0.8 μm, and the length thereof significantly exceeds 1 mm. In the case where a rotary member for an image forming part is covered with a resin tube having such linear scratches to form a resin layer, deep scratches are inherently present, even if the scratches become substantially invisible after shrinking. In this state, cracking and splitting may be caused during use of the rotary member for the image forming part.

Embodiments described above do not limit the technical scope of the present invention, and various modifications and applications can be made within the scope of the present invention. For example, a layer for protection or a layer for imparting electrical conductivity may be laminated on the surface of a heat-shrinkable resin tube by coating or tubing. Also in this case, if a linear scratch is present on the heat-shrinkable resin tube, the scratch may become a cause of cracking and splitting.

The heat-shrinkable resin tube of the present invention can be used for forming a resin layer not only on a rotary member for an image forming part but also on various rotary members in an image forming apparatus, such as a roller that supports an endless belt, a paper discharge roller, a dust removing roller, and a transport roller. The use of the heat-shrinkable resin tube of the present invention can suppress cracking and splitting of the tube, and thus these rotary members can be manufactured more easily.

As described above, the heat-shrinkable resin tube and rotary members for an image forming apparatus of the present invention have substantially no linear scratches which may easily cause cracking and splitting, and can be widely used in various image forming apparatuses such as a copy machine, a printer, and a facsimile.

What is claimed is:

1. A heat-shrinkable resin tube for forming a resin layer on a rotary member for an image forming apparatus, wherein a maximum depth of at least one linear scratch on a surface of the resin tube is 0.8 μm or less, and, in the case of a plurality of linear scratches being present on the surface of the resin tube, the depths of each of the plurality of linear scratches is suppressed to 0.8 μm or less so that no linear scratch has a depth of more than 0.8 μm, wherein the at least one linear scratch extends in a direction parallel to an axial direction of the resin tube or in a direction tilted by 20° or less with respect to the axial direction:, a maximum length of the at least one linear scratch is 1 mm or less;

the resin tube has a thickness of 100 μm or less; and the resin tube is obtained by the method in which a tube inflated by sending air inside the tube is pinched with two pairs of pinch rollers, thereby filling the tube with air, and the distance between the pairs of pinch rollers is decreased to increase the inner pressure of the tube, thereby inflating the tube, and a surface of the inflated tube is not rubbed with a fixing member.

2. The resin tube according to claim 1, wherein the rotary member is a roller or a belt for developing, charging, or transfer.

3. A rotary member for an image forming apparatus, comprising a resin layer formed using the resin tube according to claim 1.

* * * * *